(12) United States Patent
Parmentier et al.

(10) Patent No.: US 8,596,042 B2
(45) Date of Patent: Dec. 3, 2013

(54) SYSTEM AND METHOD FOR SELECTIVE CATALYTIC REDUCTION CONTROL

(75) Inventors: Michael Parmentier, Chatillon (BE); Julien Schmitt, Kuntzig (FR)

(73) Assignee: Delphi International Operations Luxembourg S.A.R.L., Luxembourg (LU)

( * ) Notice: Subject to any disclaimer, the term of this patent is extended or adjusted under 35 U.S.C. 154(b) by 757 days.

(21) Appl. No.: 12/231,051

(22) Filed: Aug. 28, 2008

(65) Prior Publication Data

US 2010/0050614 A1 Mar. 4, 2010

(51) Int. Cl.
*F01N 3/00* (2006.01)
(52) U.S. Cl.
USPC .............. 60/286; 60/277; 60/275; 60/295
(58) Field of Classification Search
USPC .................... 60/274, 286, 295, 301, 277
See application file for complete search history.

(56) References Cited

U.S. PATENT DOCUMENTS

| | | | | |
|---|---|---|---|---|
| 4,929,581 A * | 5/1990 | Steinwandel et al. | ............ | 502/2 |
| 6,415,602 B1 * | 7/2002 | Patchett et al. | .............. | 60/286 |
| 6,701,707 B1 * | 3/2004 | Upadhyay et al. | ............ | 60/277 |
| 6,947,831 B2 * | 9/2005 | van Nieuwstadt | ............ | 701/114 |
| 8,429,898 B2 * | 4/2013 | Darr et al. | .............. | 60/285 |
| 2004/0040289 A1 * | 3/2004 | Mazur et al. | .............. | 60/295 |
| 2004/0074229 A1 * | 4/2004 | Upadhyay et al. | ............ | 60/286 |
| 2004/0098974 A1 | 5/2004 | Nieuwstadt et al. | | |
| 2006/0000202 A1 * | 1/2006 | Ripper et al. | .............. | 60/286 |
| 2006/0086080 A1 * | 4/2006 | Katogi et al. | .............. | 60/278 |
| 2006/0130458 A1 * | 6/2006 | Solbrig | .............. | 60/286 |
| 2006/0130461 A1 * | 6/2006 | Gabrielsson et al. | .............. | 60/286 |
| 2007/0137181 A1 | 6/2007 | Upadhyay et al. | | |
| 2008/0216463 A1 * | 9/2008 | Chaineux et al. | .............. | 60/274 |
| 2008/0250774 A1 * | 10/2008 | Solbrig | .............. | 60/295 |
| 2009/0035194 A1 * | 2/2009 | Robel et al. | .............. | 422/177 |
| 2009/0049827 A1 * | 2/2009 | Wei et al. | .............. | 60/286 |
| 2009/0185954 A1 * | 7/2009 | Qi et al. | .............. | 422/62 |
| 2009/0199542 A1 * | 8/2009 | Walz et al. | .............. | 60/276 |
| 2009/0272104 A1 * | 11/2009 | Garimella et al. | .............. | 60/287 |
| 2009/0293457 A1 * | 12/2009 | Grichnik et al. | .............. | 60/286 |
| 2009/0301066 A1 * | 12/2009 | Sindano et al. | .............. | 60/286 |

FOREIGN PATENT DOCUMENTS

| DE | 102005012567 | 9/2006 |
|---|---|---|
| JP | 2001-27113 | 1/2001 |
| JP | 2002219337 | 8/2002 |

(Continued)

OTHER PUBLICATIONS

English Language Machine Translation of JP 2003-314254 A.*

(Continued)

*Primary Examiner* — Thomas Denion
*Assistant Examiner* — Anthony Ayala Delgado
(74) *Attorney, Agent, or Firm* — Mark H. Svoboda

(57) ABSTRACT

A selective catalytic reduction (SCR) catalyst control system and method for an engine is disclosed. Urea injection to an SCR catalyst is determined based on an SCR catalyst model, which determines a value of stored $NH_3$ in the SCR catalyst based on the $NO_x$ engine emission value, the SCR catalyst temperature, the quantity of urea supplied to the SCR catalyst and a pre-determined efficiency of conversion of $NO_x$ gases. A target value of stored $NH_3$ and the value of stored $NH_3$ in the SCR catalyst is then used to determine a stored $NH_3$ differential, which is then used to calculate urea injection.

34 Claims, 3 Drawing Sheets

(56) References Cited

FOREIGN PATENT DOCUMENTS

| JP | 2002250220 | | 9/2002 |
|----|------------|---|--------|
| JP | 2003-293740 | | 10/2003 |
| JP | 2003293737 | | 10/2003 |
| JP | 2003314254 A | * | 11/2003 |
| JP | 2006017115 | | 1/2006 |
| WO | 2005/068797 | | 7/2005 |

OTHER PUBLICATIONS

EP Search Report dated Jan. 28, 2008.
Japan Office Action dated Jan. 26, 2012.

* cited by examiner

SYSTEM AND METHOD FOR SELECTIVE CATALYTIC REDUCTION CONTROL

BACKGROUND OF THE INVENTION

The present invention relates to control of Selective Catalytic Reduction (SCR) catalyst and particularly, but not exclusively, to control of an SCR catalyst in vehicle engines.

Selective Catalytic Reduction (SCR) catalysts remove nitrogen oxides ($NO_x$), often the most abundant and polluting component in exhaust gases, through a chemical reaction between the exhaust gases, a reducing agent, and a catalyst.

The control of Selective Catalytic Reduction (SCR) catalysts consists of injecting an amount of reducing agent, typically urea, also known as carbamide (($NH_2)_2CO$), which decomposes to ammonia ($NH_3$) and carbon dioxide in the presence of water, oxygen and heat. Ammonia then reacts with $NO_x$ gases to produce nitrogen and water. The amount of reducing agent injected is required to provide the maximum $NO_x$ conversion efficiency whilst keeping excess $NH_3$, also known as $NH_3$ slip, to low values. SCR catalysts have mainly been introduced on heavy duty vehicles where high $NO_x$ levels are present and where steady state can be considered to be the main operating conditions. In these conditions, SCR control consists of supplying a certain $NH_3$ to $NO_x$ ratio, usually mapped as a function of speed and load.

Applying this kind of control on a passenger car, where transient conditions are more frequent, usually requires specific transient corrections. Moreover, vanadium based catalysts are often used on heavy duty vehicles and this technology is known to have a reduced buffering effect (the temporary storage of $NH_3$) than new Zeolite based catalysts (Fe, Cu) used on passenger car (or light duty) applications.

Another possible way to control an SCR catalyst is to model the chemical behaviour of the catalyst and implement the model in the Engine Control Unit (ECU). This approach requires a high amount of calibration work in order to identify all the parameters that need to be taken into account in a chemical model. The calculation load required for this approach is also very high as it would require to calculate multiple complex chemical reactions occurring in the catalyst in slices along its length. Chemical reactions in the catalyst depend on the temperature of the catalyst and on the concentration of the different compounds, which vary along the length of the catalyst, especially during transients. So to obtain an accurate model of all the reactions in the catalyst, the calculations would require to model several slices in series. Closed-loop control of such a system is usually realized with $NO_x$ sensors before and after the SCR catalyst, but $NO_x$ sensors are also sensitive to $NH_3$ creating additional difficulty that is required to be taken into account by the closed-loop control.

DE 102005012568 discloses a device and method for removing nitrogen oxide from the exhaust of an internal combustion engine. An aggregate containing a reducing agent is added to the exhaust dependent on variables such as engine load, air/fuel ratio and engine revolutions.

SUMMARY OF THE INVENTION

According to a first aspect of the present invention there is provided a selective catalytic reduction (SCR) catalyst control system for an engine having an SCR catalyst comprising:

a nitrogen oxides ($NO_x$) engine emission determination means for determining a $NO_x$ engine emission value;

a urea control means enabled to supply a quantity of urea to the SCR catalyst;

a $NO_x$ efficiency target means, which determines a target value of stored ammonia ($NH_3$) in the SCR catalyst based on a required $NO_x$ efficiency and an SCR catalyst temperature determined from an SCR catalyst temperature determination means;

an SCR catalyst model which determines a value of stored $NH_3$ in the SCR catalyst based on the $NO_x$ engine emission value, the SCR catalyst temperature, the quantity of urea supplied to the SCR catalyst and a pre-determined efficiency of conversion of $NO_x$ gases; and differential determination means enabled to compare the target value of stored $NH_3$ and the value of stored $NH_3$ in the SCR catalyst to determine a stored $NH_3$ differential, wherein the urea control means determines the required quantity of urea to supply to the SCR catalyst based on the stored $NH_3$ differential.

In certain embodiments, the $NO_x$ ratio calculation means receives a first temperature value from a first temperature sensor and the $NO_x$ ratio is calculated according to the first temperature value.

In one embodiment, the first temperature sensor may measures oxidation catalyst temperature. In an alternative embodiment, the first temperature sensor may measure particulate filter temperature. In a further alternative embodiment, the first temperature sensor measures the first temperature value between a particulate filter and an oxidation catalyst The $NO_x$ engine emission determination means may be an engine-out $NO_x$ model. The engine-out $NO_x$ model calculates the $NO_x$ engine emission value based on injected fuel flow into the engine, engine load, Exhaust Gas Recirculation (EGR) rate and ambient temperature.

Alternatively, the $NO_x$ engine emission determination means is a $NO_x$ sensor positioned upstream of the SCR catalyst, which provides a $NO_x$ engine emission value.

The $NO_x$ efficiency target means may further utilize values from sensors measuring one or more of the following parameters to determine a target value of stored ammonia ($NH_3$) in the SCR catalyst: engine speed; engine load; air temperature; coolant temperature; or Diesel Particulate Filter (DPF) regeneration mode.

The SCR model may determine a $NH_3$ slip value, which represents the amount of $NH_3$ exiting the SCR catalyst, by calculating an SCR catalyst capacity based on physical characteristics of the SCR catalyst and the SCR catalyst temperature and taking into account the value of stored $NH_3$ in the SCR catalyst. The system may further comprise $NH_3$ slip control means and a $NO_x$ engine emission increasing means, wherein, if it is determined that the $NH_3$ slip value is above, or is predicted to rise above, a pre-determined value, $NO_x$ engine emission increasing is directed to increase $NO_x$ engine emissions, thereby reducing $NH_3$ slip. In some embodiments, the $NO_x$ engine emission increasing means is a Exhaust Gas Recirculation (EGR) means, wherein $NO_x$ engine emissions are increased by reducing or stopping the amount of EGR to the engine.

The system may further comprise an SCR model modification means. The SCR model modification means may comprise a $NH_3$ sensor enabled to measure actual $NH_3$ slip from the SCR catalyst, actual $NH_3$ slip averaging means and SCR model $NH_3$ slip value averaging means, and comparison means enabled to compare outputs from the actual $NH_3$ slip averaging means and the SCR model $NH_3$ slip value averaging means and determine an $NH_3$ slip estimation error, wherein the SCR model is modified by the SCR model modification means according to the $NH_3$ slip estimation error.

The SCR model modification means may be enabled to modify the SCR model by altering the pre-determined efficiency of conversion of $NO_x$ gases based on the $NH_3$ slip estimation error. Alternatively or additionally, the SCR model modification means is enabled to modify the SCR model by altering the SCR catalyst capacity based on the $NH_3$ slip estimation error.

The SCR model modification means may modify the SCR model by altering the SCR catalyst capacity if the SCR catalyst is filled with $NH_3$ by a pre-determined minimum amount for a predetermined time.

According to a second aspect of the present invention there is provided a method of controlling selective catalytic reduction (SCR) in an engine having an SCR catalyst comprising the steps of:

(i) determining a nitrogen oxides ($NO_x$) engine emission value;

(ii) controlling supply of a quantity of urea to the SCR catalyst;

(iii) measuring an SCR catalyst temperature from the SCR catalyst (iv) determining a stored ammonia ($NH_3$) target value in the SCR catalyst based on a target $NO_x$ conversion efficiency and the SCR catalyst temperature;

(v) calculating a $NO_x$ ratio, being the ratio of nitrogen dioxide in the $NO_x$ engine emission value;

(vi) calculating a stored $NH_3$ value in the SCR catalyst using an SCR catalyst model based on the $NO_x$ engine emission value, the SCR catalyst temperature, the quantity of urea supplied to the SCR catalyst, the $NO_x$ ratio and a pre-determined efficiency of conversion of $NO_x$ gases; and (vii) comparing the target value of stored $NH_3$ and the value of stored $NH_3$ in the SCR catalyst to determine a stored $NH_3$ differential, wherein step (ii) controls the supply of the required quantity of urea to the SCR catalyst based on the stored $NH_3$ differential.

The step of calculating a $NO_x$ ratio may comprise measuring a first temperature value from a first temperature sensor and calculating the $NO_x$ ratio according to the first temperature value. In one embodiment, the first temperature value is an oxidation catalyst temperature value. In an alternative embodiment, the first temperature value is a particulate filter temperature. In a further alternative embodiment, the first temperature value is measured between a particulate filter and an oxidation catalyst.

Step (i) may comprise calculating the ($NO_x$) engine emission value based on an engine-out $NO_x$ model. The step of calculating the ($NO_x$) engine emission value may take injected fuel flow into the engine, engine load, Exhaust Gas Recirculation (EGR) rate and ambient temperature into account in the engine-out $NO_x$ model.

Alternatively, step (i) comprises measuring a $NO_x$ engine emission value from a $NO_x$ sensor positioned upstream of the SCR catalyst.

Step (iv) may further comprise measuring one or more of the following parameters to determine a target value of stored ammonia ($NH_3$) in the SCR catalyst: engine speed; engine load; air temperature; coolant temperature; or Diesel Particulate Filter (DPF) regeneration mode.

Step (vi) may further comprise determining a $NH_3$ slip value, which represents the amount of $NH_3$ exiting the SCR catalyst, by calculating, within the SCR model, an SCR catalyst capacity based on physical characteristics of the SCR catalyst and the SCR catalyst temperature and taking into account the value of stored $NH_3$ in the SCR catalyst.

In some embodiments, the method further comprises the steps of controlling $NH_3$ slip and increasing $NO_x$ engine emissions, wherein, if it is determined that the $NH_3$ slip value is above, or is predicted to rise above, a pre-determined value, $NO_x$ engine emissions are increased, thereby reducing $NH_3$ slip. The step of increasing $NO_x$ engine emissions may comprise reducing or stopping the amount of Exhaust Gas Recirculation (EGR) to the engine.

The method also further comprise modifying the SCR model used in step (vi). The step of modifying the SCR model comprises measuring actual $NH_3$ slip from the SCR catalyst using an $NH_3$ sensor, calculating the SCR model $NH_3$ slip from the SCR model, averaging the actual $NH_3$ slip over a pre-determined time and averaging SCR model $NH_3$ slip over the same pre-determined time, comparing the averaged actual $NH_3$ slip and the averaged SCR model $NH_3$ slip and determining an $NH_3$ slip estimation error, wherein the SCR model is subsequently modified according to the $NH_3$ slip estimation error. The step of modifying the SCR model may also modify the SCR model by altering the pre-determined efficiency of conversion of $NO_x$ gases based on the $NH_3$ slip estimation error. Alternatively or in a further embodiment, the step of modifying the SCR model modifies the SCR model by altering the SCR catalyst capacity based on the $NH_3$ slip estimation error. In a further embodiment, the step of modifying the SCR model may modify the SCR model by altering the SCR catalyst capacity if the SCR catalyst is filled with $NH_3$ by a pre-determined minimum amount for a predetermined time.

According to a third aspect of the present invention there is provided a Diesel engine incorporating a selective catalytic reduction (SCR) catalyst control system according to the first aspect of the present invention.

BRIEF DESCRIPTION OF THE DRAWINGS

Embodiments of the present invention will now be described, by way of example only, with reference to the drawings, in which.

DETAILED DESCRIPTION OF THE INVENTION

As explained above, the engine-out $NO_x$ flow needs to be known to inject the correct amount of urea, as too little gives poor efficiency and too much gives NH3 slip. Prior art systems use a $NO_x$ sensor located upstream of the SCR catalyst.

The present invention uses simplified models to calculate the $NO_x$ conversion efficiency of the SCR catalyst and drive the injection quantity of urea required to maintain this efficiency to a certain level. The model can take into account several key parameters including:

total $NO_x$ flow entering the SCR catalyst and $NO_2/NO_x$ ratio;

SCR catalyst temperature; and stored NH3 in the SCR catalyst.

The total $NO_x$ flow can be measured by a $NO_x$ sensor located before the SCR.

Figure 1:
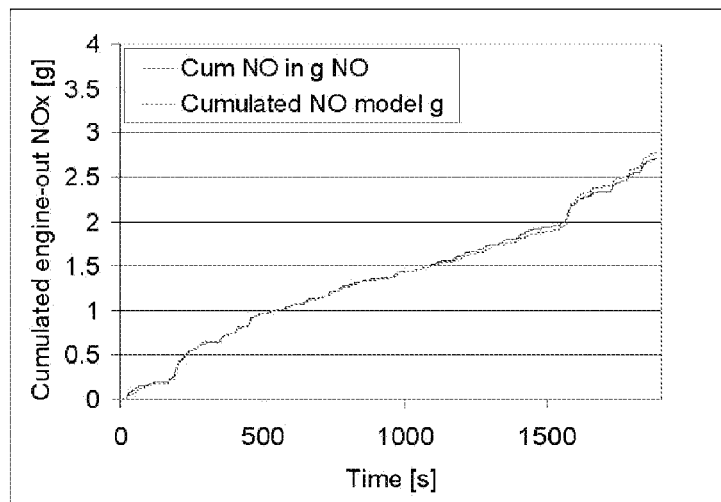
FIG. 1 is a graph of measured and modelled $NO_x$ emissions.

Alternatively, as used in a preferable embodiment on the present invention, a $NO_x$ model can be used that replaces the $NO_x$ sensor. The $NO_x$ flow is modelled as a fraction of injected fuel flow. This fraction is mapped as a function of engine load (IMEP—Indicated Mean Effective Pressure), corrected for inert EGR (Exhaust Gas Recirculation) rate and ambient temperature. FIG. 1 shows the comparison between modelled and measured $NO_x$ using a US city cycle for passenger cars called FTP75 or EPA III.

Figure 2:
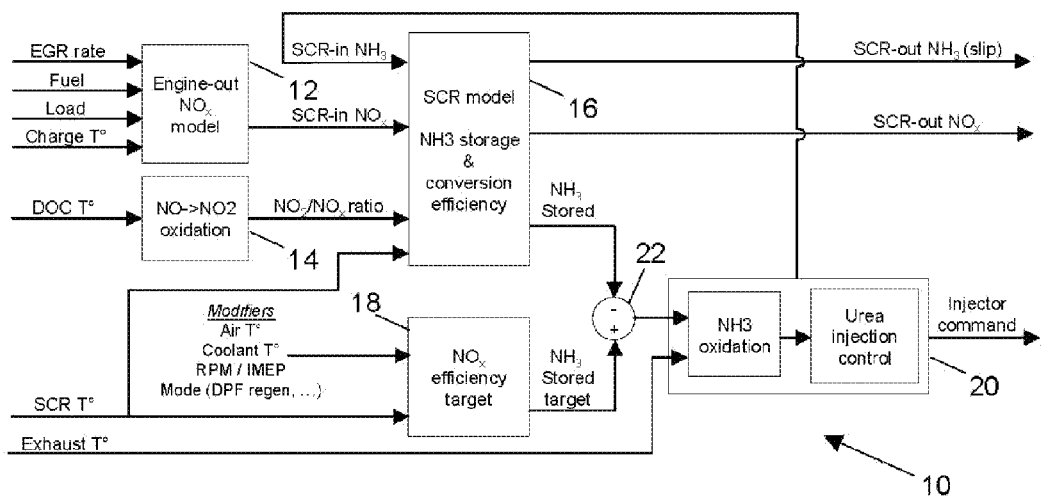
FIG. 2 shows a flow diagram of an open loop control structure for a Selective Catalytic Reduction (SCR) catalyst.

Referring now to FIG. 2, an open loop model for selective catalytic reduction control 10 in an exhaust system of an engine comprises an engine-out $NO_x$ model 12, a $NO_2/NO_x$ ratio model 14, an SCR model 16, which models storage of $NH_3$ and $NO_x$ conversion efficiency, a $NO_x$ efficiency target model 18 and an urea injection control 20.

The engine-out $NO_x$ model 12, as described above, uses injected fuel flow to calculate the $NO_x$ emission taking into account engine load, EGR rate and ambient temperature.

The $NO_2/NO_x$ ratio model 14, calculates a $NO_2/NO_x$ ratio based on a temperature measurement from an oxidation catalyst in the exhaust system. Although, the temperature measurement may come from an alternative position in the exhaust system. In particular, the temperature could be measured between the oxidation catalyst and a particulate filter or even after the particulate filter. Furthermore, a particulate filter can effect the $NO_2/NO_x$ ratio and therefore can be taken into consideration in the $NO_2/NO_x$ ratio model 14.

It will be appreciated that $NH_3$ injected into the SCR must either be (1) consumed in a chemical reaction in the SCR, (2) stored in the SCR, or (3) released from the SCR as $NH_3$ slip. The SCR model 16 calculates the $NO_x$ conversion efficiency of an SCR in the exhaust system as a function of stored $NH_3$ in the SCR, the amount of injected urea from the urea injection control 20, and temperature. This efficiency can then be corrected for the $NO_2/NO_x$ ratio obtained from the $NO_x$ ratio model 14. When the $NO_x$ conversion efficiency is known, the amount of $NH_3$ used for $NO_x$ reduction can be calculated based on a pre-determined amount of $NH_3$ being required to reduce a pre-determined amount of $NO_x$ and, as such the amount of stored $NH_3$ is calculated, along with any excess $NH_3$ ($NH_3$ slip) or any output of $NO_x$ gases. Since the storage capacity of an SCR catalyst decreases with temperature, if the SCR temperature increases too quickly, a quantity of stored $NH_3$ will be released. The maximum storage capacity for $NH_3$ of the SCR catalyst is modeled as a predetermined function of SCR temperature. Therefore, $NH_3$ leaving the SCR ($NH_3$ slip) is also an output of the SCR model 16, the $NH_3$ slip being calculated as the difference between the amount of $NH_3$ from the injected urea from the urea injection control 20 and the sum (amount of $NH_3$ that is reacted with NOx plus amount of $NH_3$ that is stored in the SCR). This provides a means to compare the SCR model 16 to a $NH_3$ sensor located downstream of the SCR catalyst (discussed in more detail below with respect to closed loop control).

Figure 3:
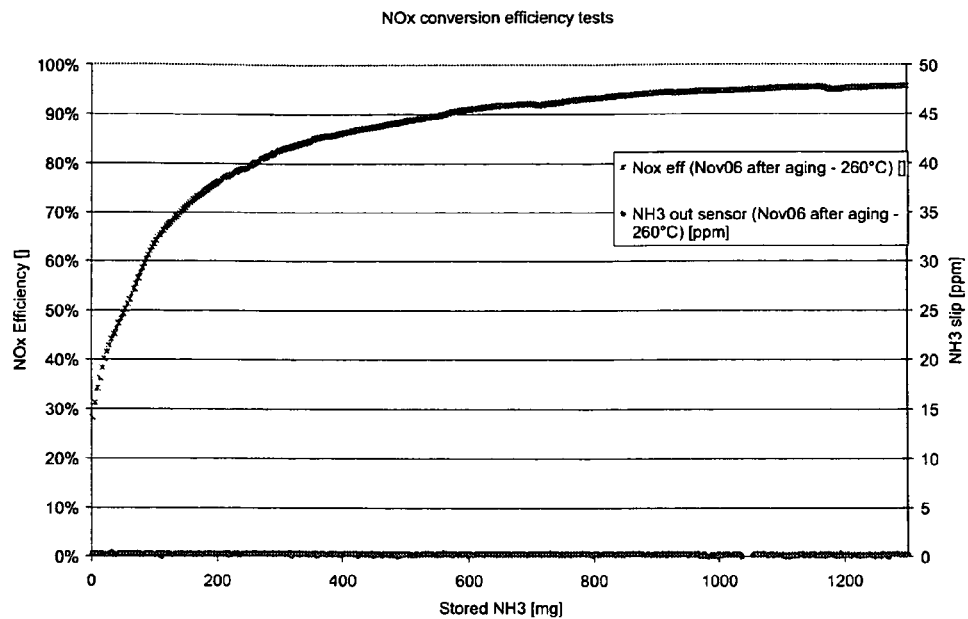
FIG. 3 is a graph showing $NO_x$ efficiency against stored $NH_3$.

The $NO_x$ efficiency target model 18 generates a target value for stored $NH_3$, $NO_x$ conversion efficiency being dependent on stored $NH_3$ in the SCR catalyst, based on the required $NO_x$ efficiency and the SCR temperature. The target $NO_x$ efficiency is then corrected for other conditions including engine speed, engine load, air temperature, coolant temperature, and Diesel Particulate Filter (DPF) regeneration mode, if appropriate to the system. An example of $NO_x$ efficiency with respect to stored $NH_3$ is shown in FIG. 3.

The target stored $NH_3$ value from the $NO_x$ efficiency target model 18 is then compared to the calculated stored $NH_3$ value to generate a stored $NH_3$ differential 22, which is the difference between what stored $NH_3$ currently is and where it requires to be (target stored $NH_3$).

The urea injection control 20 has, as its inputs, the stored $NH_3$ differential 22 and an exhaust gas temperature value, measured directly from the exhaust gas. Based on the $NH_3$ differential 22 a urea injection amount is calculated, in this case, using a proportional gain controller, to bring the calculated stored $NH_3$ value to the target stored $NH_3$ value. To account for oxidation of $NH_3$ at high temperature and/or lack of urea hydrolysis at low temperature, the amount of injected urea is modified by a map function of exhaust gas temperature.

Figure 4:
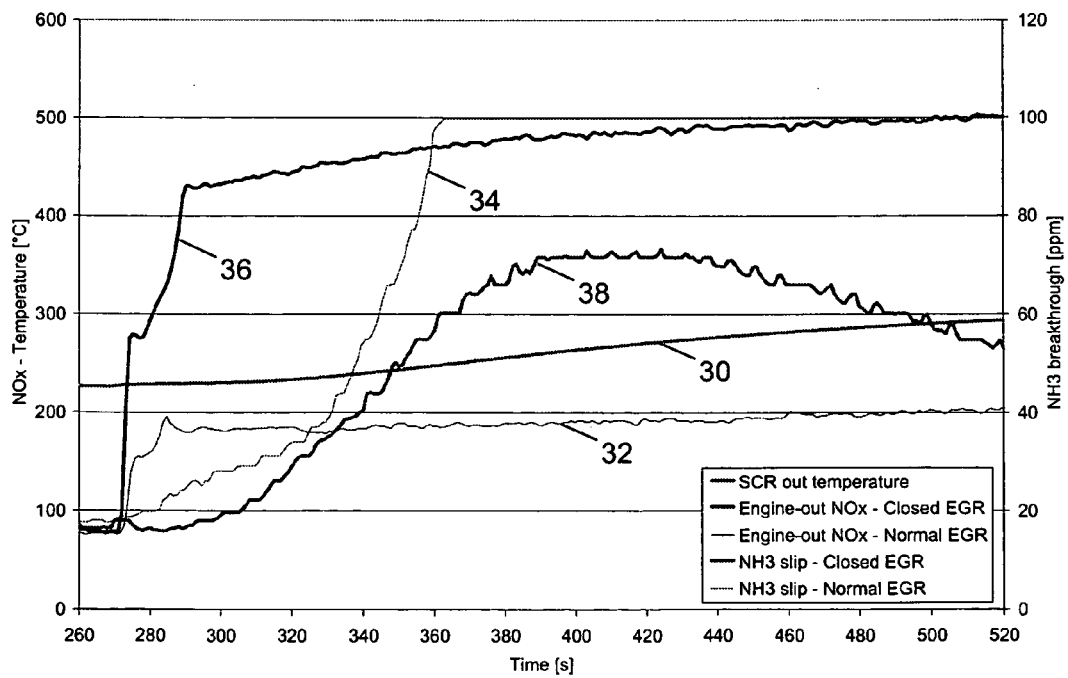
FIG. 4 is a graph showing variations in $NH_3$ slip depending on control of $NO_x$ emissions.

When $NH_3$ slip occurs, the amount of $NH_3$ leaving the SCR can be reduced by increasing the rate of $NH_3$ consumption in the SCR. To achieve this, an increase in $NO_x$ flow in the SCR is required, as the $NH_3$ reacts with $NO_x$. In this example, and as shown in FIG. 4, an increase in $NO_x$ flow is achieved by turning off EGR. SCR temperature 30 is shown increasing around 200° C. to around 300° C. If no action is taken, that is EGR is left as normal, $NO_x$ emissions 32, from the engine, stays at around 40 ppm (parts per million) but $NH_3$ slip 34 increases dramatically to more than 100 ppm, which is the saturation of the sensor used. Conversely, if EGR is turned off, $NO_x$ emissions 36 from the engine increase to around 100 ppm but $NH_3$ slip 38 peaks at about 70 ppm before reducing. It should be noted that $NO_x$ emissions 32, 36 are from the engine and not vented from the exhaust. $NH_3$ slip is caused by having too much $NH_3$ in the SCR catalyst with respect to $NO_x$ and, therefore, the $NO_x$ conversion efficiency will be as high as is possible.

Additionally, the urea injection can be shut-off to reduce the amount of $NH_3$ in the SCR catalyst. These actions are taken when the $NH_3$ slip, either computed by the SCR model 16 or measured by a $NH_3$ sensor, goes above a pre-determined threshold.

As indicated above, an important factor of the SCR model 16 is the stored $NH_3$ mass. This calculation of the amount of stored $NH_3$ can be, or certainly become, inaccurate for a number of reasons during implementation in a real world system. For example, as the SCR catalyst ages, its capacity and efficiency can decrease over time causing an error in the estimation of stored $NH_3$. Furthermore, if the engine produces a different level of $NO_x$ than modelled due to engine to engine variations or aging of the engine or the urea flow is different than expected, again, an error in the estimation of stored $NH_3$ can occur.

An accurate physical modelling of the $NH_3$ slip of the catalyst is too complicated to be implemented and calibrated in an ECU (Engine Control Unit), as it would involve a complex chemical model. The SCR model 16 is an average estimator of the $NH_3$ slip. The transient behaviour of the SCR model 16 is not accurate because an SCR catalyst's capacity for storing $NH_3$ is directly linked to a temperature which is supposed to be constant over the length of the SCR catalyst. But the average $NH_3$ mass predicted by the SCR model 16 can be compared to the average $NH_3$ mass seen by a $NH_3$ sensor downstream of the SCR catalyst in the exhaust system.

Figure 5:
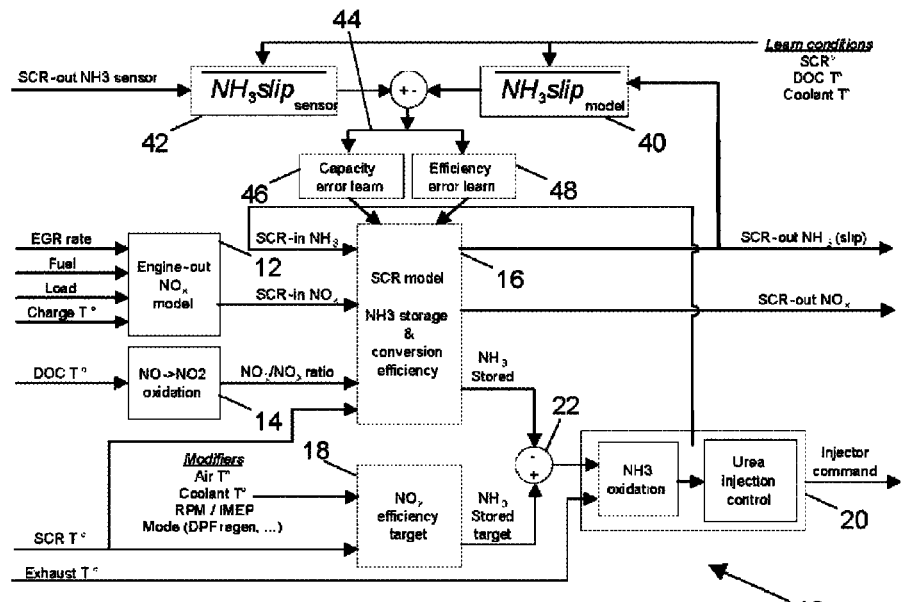
FIG. 5 is a flow diagram of an open loop control structure for a Selective Catalytic Reduction catalyst with an additional closed loop control section.

Accordingly, referring to FIG. 5, a modeled $NH_3$ slip averaging means 40 and an actual (sensed) $NH_3$ slip averaging means 42 average the $NH_3$ slip from the model 16 and the sensor respectively. A $NH_3$ slip error 44 is then generated by comparing the average modeled $NH_3$ slip to the actual $NH_3$ slip, and the $NH_3$ slip error 44 is passed to a capacity error 46 means and an efficiency error means 48.

Under special conditions, where the model is known to have the best precision, including a high enough DOC temperature and SCR temperature within a predetermined range, the $NH_3$ slip out of the SCR model 16 and the $NH_3$ flow seen by the $NH_3$ sensor are monitored over a fixed time. Once the time has elapsed, both values should be equal if the SCR model 16 is accurate.

Figure 6:
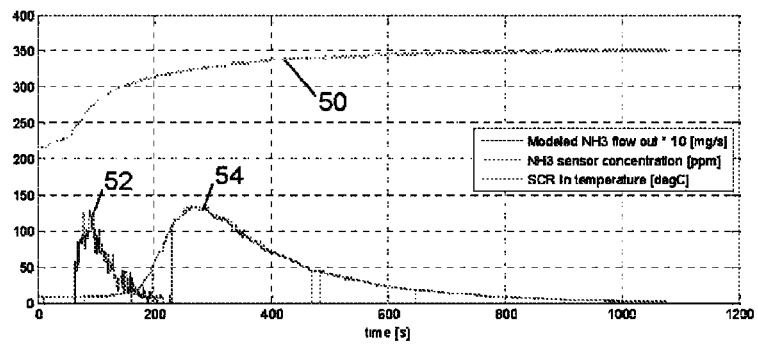
FIG. 6 is a graph showing a temperature transient showing modelled $NH_3$ outflow from the catalyst, measures $NH_3$ concentration from a sensor and temperature of gases at the SCR inlet.

Referring to FIG. 6, SCR inlet temperature 50 is shown increasing from around 200 C to 350 C during a temperature transient. $NH_3$ slip modelled value 52 and $NH_3$ slip sensor value 54 both show an increase in $NH_3$ slip as a result, although there is time lag associated with the $NH_3$ slip sensor value 54.

If the monitoring period is long enough, transient errors can be neglected and after a pre-determined time, if an error remains between the modelled and sensed $NH_3$ slip, the SCR model 16 can be altered accordingly.

According to various factors associated with the SCR model 16 the modeled capacity of the SCR catalyst has to be corrected or the modeled efficiency of the $NO_x$ conversion modified. A correction to the modeled capacity is made if the SCR catalyst is filled with $NH_3$ by a pre-determined minimum amount for a predetermined time. Otherwise, it performs a modification to the modeled efficiency of the $NO_x$ conversion. The modification to the modeled efficiency of the $NO_x$ conversion can also correct the engine-out $NO_x$ model in case this input parameter is wrong. A modification to the pre-determined modeled efficiency of the $NO_x$ conversion acts as a global modifier as it corrects SCR efficiency, injector error, $NO_x$ flow model error and urea quality. As the target capacity of the SCR catalyst may be set quite low to avoid $NH_3$ slip during normal operation, the conditions required for a capacity correction may never occur. As such, it can be beneficial to increase the $NH_3$ stored target so that a capacity correction can occur (and the SCR catalyst is filled to its maximum capacity). An efficiency modification occurs more often because, as mentioned previously, certain conditions are required for a capacity correction.

Further modifications and improvements may be made without departing from the scope of the present invention.

The invention claimed is:

1. An SCR catalyst control system for an engine having an SCR catalyst, said control system including control hardware comprising:
a $NO_x$ engine emission determination means for measuring or calculating a $NO_x$ engine emission value;
a urea control means enabled to supply a quantity of urea to the SCR catalyst;
a $NO_x$ efficiency target model, which calculates a stored $NH_3$ target value in the SCR catalyst based on a target conversion $NO_x$ efficiency and an SCR catalyst temperature, measured or calculated from an SCR catalyst temperature determination means;
an SCR catalyst computational model which calculates a stored $NH_3$ value in the SCR catalyst based on the $NO_x$ engine emission value, the SCR catalyst temperature, the quantity of urea supplied to the SCR catalyst and a pre-determined efficiency of conversion of $NO_x$ gases; and
characterized by a $NO_x$ ratio model which calculates a $NO_x$ ratio using a predetermined characteristic of oxidation of NO to $NO_2$ in an oxidation catalyst as a function of temperature and based on a first temperature value received from a first temperature sensor, the NOx ratio being the ratio of nitrogen dioxide to total $NO_x$ in the $NO_x$ engine emission value, and wherein the SCR catalyst model takes into account the $NO_x$ ratio when calculating the stored $NH_3$ value,
a first subtractor enabled to compare the stored $NH_3$ target value and the stored $NH_3$ value in the SCR catalyst to calculate a stored $NH_3$ differential,
wherein the urea control means supplies the required quantity of urea to the SCR catalyst based on the stored $NH_3$ differential.

2. A system as claimed in claim 1, wherein the first temperature sensor measures oxidation catalyst temperature.

3. A system as claimed in claim 1, wherein the first temperature sensor measures particulate filter temperature.

4. A system as claimed in claim 1, wherein the first temperature sensor measures the first temperature value at a location between a particulate filter and an oxidation catalyst.

5. A system as claimed in claim 1, wherein the $NO_x$ engine emission determination means is an engine-out $NO_x$ model.

6. A system as claimed in claim 5, wherein the engine-out $NO_x$ model calculates the $NO_x$ engine emission value based on injected fuel flow into the engine, engine load, EGR rate and ambient temperature.

7. A system as claimed in claim 1, wherein the $NO_x$ engine emission determination means is a $NO_x$ sensor positioned upstream of the SCR catalyst, which provides a $NO_x$ engine emission value.

8. A system as claimed in claim 1, wherein the $NO_x$ efficiency target model further utilizes values from sensors measuring one or more of the following parameters to calculate the stored $NH_3$ target value in the SCR catalyst: engine speed; engine load; air temperature; coolant temperature; or DPF regeneration mode.

9. A system as claimed in claim 1, wherein the SCR model calculates a $NH_3$ slip value, which represents the amount of $NH_3$ exiting the SCR catalyst, by calculating an SCR catalyst capacity based on physical characteristics of the SCR catalyst and the SCR catalyst temperature and taking into account the value of stored $NH_3$ in the SCR catalyst.

10. A system as claimed in claim 1, further comprising a $NO_x$ engine emission increasing means, wherein, if it is determined that the $NH_3$ slip value is above, or is predicted to rise above, a pre-determined value, then the $NO_x$ engine emission increasing means is directed to increase $NO_x$ engine emissions, thereby reducing $NH_3$ slip.

11. A system as claimed in claim 10, wherein the $NO_x$ engine emission increasing means is an EGR means, wherein $NO_x$ engine emissions are increased by reducing or stopping the amount of EGR to the engine.

12. A system as claimed in claim 1, wherein the system further comprises an SCR model modification means.

13. A system as claimed in claim 12, wherein the SCR model modification means comprises a $NH_3$ sensor enabled to measure actual $NH_3$ slip from the SCR catalyst, an actual $NH_3$ slip averaging means and an SCR model $NH_3$ slip value averaging means, and a second subtractor enabled to compare outputs from the actual $NH_3$ slip averaging means and the SCR model $NH_3$ slip value averaging means and calculate an $NH_3$ slip estimation error, wherein the SCR model is modified by the SCR model modification means according to the $NH_3$ slip estimation error.

14. A system as claimed in claim 12, wherein the SCR model modification means is enabled to modify the SCR model by altering the pre-determined efficiency of conversion of $NO_x$ gases based on the $NH_3$ slip estimation error.

15. A system as claimed in claim 12, wherein the SCR model modification means is enabled to modify the SCR model by altering the SCR catalyst capacity based on the $NH_3$ slip estimation error.

16. A system as claimed in claim 15, wherein the SCR model modification means modifies the SCR model by altering the SCR catalyst capacity if the SCR catalyst is filled with $NH_3$ by a pre-determined minimum amount for a predetermined time.

17. A method of controlling SCR in an engine having an SCR catalyst comprising the steps of:
   (i) calculating or measuring a $NO_x$ engine emission value;
   (ii) controlling supply of a quantity of urea to the SCR catalyst;
   (iii) measuring an SCR catalyst temperature from the SCR catalyst
   (iv) calculating a stored $NH_3$ target value in the SCR catalyst based on a target $NO_x$ conversion efficiency and the SCR catalyst temperature;
   (v) calculating a $NO_x$ ratio, being the ratio of nitrogen dioxide in the $NO_x$ engine emission value;
   (vi) calculating a stored $NH_3$ value in the SCR catalyst in an SCR catalyst model; with said SCR catalyst model having as inputs the $NO_x$ engine emission value, the SCR catalyst temperature, the quantity of urea supplied to the SCR catalyst, and the NOx ratio; wherein said SCR catalyst model includes a pre-determined efficiency of conversion of $NO_x$ gases; and
   (vii) comparing the target value of stored $NH_3$ and the value of stored $NH_3$ in the SCR catalyst to calculate a stored $NH_3$ differential,
wherein step (ii) controls the supply of the required quantity of urea to the SCR catalyst based on the stored $NH_3$ differential.

18. A method as claimed in claim 17, wherein the step of calculating a $NO_x$ ratio comprises measuring a first temperature value from a first temperature sensor and calculating the $NO_x$ ratio according to the first temperature value.

19. A method as claimed in claim 18, wherein the first temperature value is an oxidation catalyst temperature value.

20. A method as claimed in claim 18, wherein the first temperature value is a particulate filter temperature.

21. A method as claimed in claim 18, wherein the first temperature value is measured at a location between a particulate filter and an oxidation catalyst.

22. A method as claimed in claim 17, wherein step (i) comprises calculating the $NO_x$ engine emission value based on an engine-out $NO_x$ model.

23. A method as claimed in claim 22, wherein the step of calculating the $NO_x$ engine emission value takes injected fuel flow into the engine, engine load, EGR rate and ambient temperature into account in the engine-out $NO_x$ model.

24. A method as claimed in claim 17, wherein step (i) comprises measuring a $NO_x$ engine emission value from a $NO_x$ sensor positioned upstream of the SCR catalyst.

25. A method as claimed in claim 17, wherein step (iv) further comprises measuring one or more of the following parameters to calculate a target value of stored $NH_3$ in the SCR catalyst: engine speed; engine load; air temperature; coolant temperature; or DPF regeneration mode.

26. A method as claimed in claim 17, wherein step (v) further comprises calculating an $NH_3$ slip value, which represents the amount of $NH_3$ exiting the SCR catalyst, by calculating, within the SCR model, an SCR catalyst capacity based on physical characteristics of the SCR catalyst and the SCR catalyst temperature and taking into account the value of stored $NH_3$ in the SCR catalyst.

27. A method as claimed in claim 17, further comprising the steps of controlling $NH_3$ slip and increasing $NO_x$ engine emissions, wherein, if it is determined that the $NH_3$ slip value is above, or is predicted to rise above, a pre-determined value, $NO_x$ engine emissions are increased, thereby reducing $NH_3$ slip.

28. A method as claimed in claim 27, wherein the step of increasing $NO_x$ engine emissions comprises reducing or stopping the amount of EGR to the engine.

29. A method as claimed in claim 17, further comprising the step of modifying the SCR model used in step (vi).

30. A method as claimed in claim 29, wherein the step of modifying the SCR model comprises measuring actual $NH_3$ slip from the SCR catalyst using an $NH_3$ sensor, calculating the SCR model $NH_3$ slip from the SCR model, averaging the actual $NH_3$ slip over a pre-determined time and averaging SCR model $NH_3$ slip over the same pre-determined time, comparing the averaged actual $NH_3$ slip and the averaged SCR model $NH_3$ slip and calculating an $NH_3$ slip estimation error, wherein the SCR model is subsequently modified according to the $NH_3$ slip estimation error.

31. A method as claimed in claim 30, wherein the step of modifying the SCR model modifies the SCR model by altering the pre-determined efficiency of conversion of $NO_x$ gases based on the $NH_3$ slip estimation error.

32. A method as claimed in claim 29, wherein the step of modifying the SCR model modifies the SCR model by altering the SCR catalyst capacity based on the $NH_3$ slip estimation error.

33. A method as claimed in claim 32, wherein the step of modifying the SCR model modifies the SCR model by altering the SCR catalyst capacity if the SCR catalyst is filled with $NH_3$ by a pre-determined minimum amount for a predetermined time.

34. A Diesel engine incorporating an SCR catalyst control system according claim 1.

* * * * *